F. BLACKBURN & V. MOESLEIN.
Mechanical Movement.

No. 205,829. Patented July 9, 1878.

Witnesses
Henry Howson Jr.
Harry Smith

Inventors
Frederick Blackburn
and
Valentine Moeslein
by their Attorneys
Howson & Son

UNITED STATES PATENT OFFICE.

FREDERICK BLACKBURN AND VALENTINE MOESLEIN, OF PHILADELPHIA, PENNSYLVANIA, ASSIGNORS OF THREE-FIFTHS OF THEIR RIGHT TO HENRY FRIEDBERGER AND HENRY L. STROUSE, OF SAME PLACE.

IMPROVEMENT IN MECHANICAL MOVEMENTS.

Specification forming part of Letters Patent No. 205,829, dated July 9, 1878; application filed December 29, 1877.

*To all whom it may concern:*

Be it known that we, FREDERICK BLACKBURN and VALENTINE MOESLEIN, both of Philadelphia, Pennsylvania, have invented a new Mechanical Movement, of which the following is a specification:

The object of our invention is to convert a continuous rotary motion into an intermittent rotary motion by means of two cog-wheels, one of which, being the driver, on being rotated continuously, will not only impart an intermittent motion to the other, but will lock it during the intervals which elapse between its movements.

Figure 1:
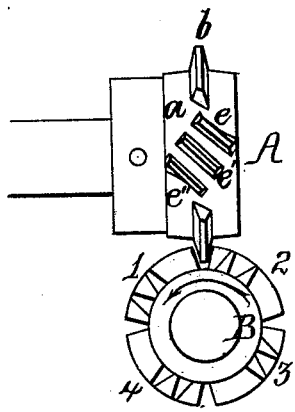
Figure 2:
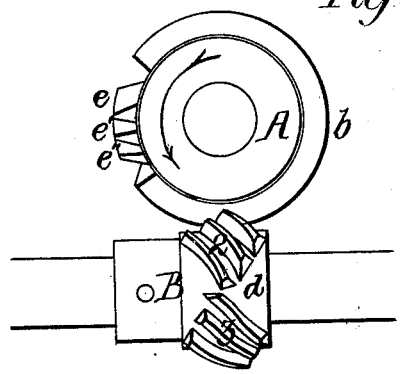
Figure 3:
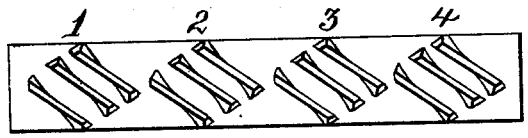

In the accompanying drawing, Figures 1 and 2 are two views of the two wheels by which our invention is carried into effect, and Fig. 3 a diagram illustrating the manner of arranging the groups of teeth on the driven wheel.

A is the driving-wheel consisting of a disk, $a$, on the periphery of which is a rib, $b$, concentric with the disk and projecting therefrom in a plane at right angles to the axis of the wheel.

The continuity of this rib is interrupted at one point where there is a group of three teeth arranged on the periphery of the disk $a$, preferably at an angle of forty-five degrees in respect to a plane at right angles to the axis of the wheel.

The wheel B consists of a disk, $d$, on the periphery of which are arranged, in the present instance, four groups, 1 2 3 4, of three teeth similar to those on the driving-wheel A. The arrangement of these four groups of teeth will be best understood by reference to Fig. 3, which shows the arrangement of the disk on a plane strip of the same width as the wheel and of a length equal to the circumference of the same.

As shown in Fig. 2, the rib $b$ occupies a position between the groups 1 and 2 of the teeth on the wheel B, and serves to lock the latter, for the end of the last tooth of group 1 is in contact with one side of the rib, and the end of the first tooth of group 2 is in contact with the opposite side of the rib.

Supposing the wheel A to be moving in the direction of the arrow, the moment the rib $b$, owing to the portion of it which is cut away, ceases to control the wheel B, the tooth $e''$ of the wheel A will be in contact with the last tooth of group 1 on the wheel B, and the middle tooth $e'$ of the wheel A will be in contact or nearly so with the front tooth of group 2 of the wheel B, so that, as the wheel A continues to move in the direction of the arrow, the wheel B must necessarily be moved in the direction of its arrow, the tooth $e$ of the wheel A finally operating on the middle tooth of group 2 of the wheel B, and the moment the latter tooth is free from contact with the tooth $e$ group 2 of the wheel B will occupy the position formerly occupied by group 1, and the wheel B will be locked by the rib $b$, which occupies a position between the groups 2 and 3 of the said wheel B, which will have been moved to the extent of one-quarter of a revolution during one complete revolution of the wheel A.

There may be more than one group of inclined teeth on the wheel A. There may, for instance, be two groups, the ribs being cut away at two points for the two groups, in which case it would take two revolutions of the wheel A to turn the wheel B once. There may be also more than four groups of teeth on the wheel B. In fact, the number of groups of teeth on the two wheels must be determined by the desired number of intermittent movements of the wheel B in respect to the movement of the wheel A.

If desired, there may be single inclined teeth, or groups of more or less than three teeth on each wheel, and the intermittent movement of the wheel B may be made irregular, while the wheel A turns at a uniform speed, by arranging two or more groups of teeth on the driving-wheel at irregular intervals.

We claim as our invention—

The wheel A, having one or more inclined teeth or groups of inclined teeth, and a rib, $b$, the continuity of which is interrupted where the inclined teeth occur, in combination with the wheel B, having any desired number of teeth or groups of teeth corresponding with the teeth of the wheel A, and arranged substantially as described, so as to be locked by the passage of the rib $b$ between the ends of the teeth or groups of teeth, as set forth.

In testimony whereof we have signed our names to this specification in the presence of two subscribing witnesses.

FREDERICK BLACKBURN.
VALENTINE MOESLEIN.

Witnesses:
RICHARD L. GARDINER,
HARRY SMITH.